United States Patent
Shapiro et al.

(10) Patent No.: US 10,271,538 B2
(45) Date of Patent: Apr. 30, 2019

(54) DEVICE FOR DISPENSING VOLATILE SUBSTANCES WITH VARIABLE MAT STRUCTURES

(71) Applicant: The Schawbel Corporation, Bedford, MA (US)

(72) Inventors: Stephen J. Shapiro, Arlington, MA (US); Wender Wang, Bedford, MA (US)

(73) Assignee: Thermacell Repellents, Inc., Bedford, MA (US)

(*) Notice: Subject to any disclaimer, the term of this patent is extended or adjusted under 35 U.S.C. 154(b) by 77 days.

(21) Appl. No.: 14/585,666

(22) Filed: Dec. 30, 2014

(65) Prior Publication Data

US 2015/0181859 A1 Jul. 2, 2015

Related U.S. Application Data

(60) Provisional application No. 61/921,795, filed on Dec. 30, 2013, provisional application No. 61/948,296, filed on Mar. 5, 2014.

(51) Int. Cl.
*A01M 29/14* (2011.01)
*A01M 29/12* (2011.01)

(52) U.S. Cl.
CPC ............ *A01M 29/14* (2013.01); *A01M 29/12* (2013.01)

(58) Field of Classification Search
CPC .............................. A01M 29/14; A01M 29/12
See application file for complete search history.

(56) References Cited

U.S. PATENT DOCUMENTS

| | | | | |
|---|---|---|---|---|
| 5,566,693 A * | 10/1996 | Gunderman | ....... | A45D 40/0087 132/333 |
| 5,700,430 A | 12/1997 | Bonnema et al. | | |
| 6,033,212 A * | 3/2000 | Bonnema | ............ | A01M 1/2083 239/139 |
| 6,154,607 A | 11/2000 | Flashinski | | |
| 6,374,045 B2 * | 4/2002 | Basaganas Millan | .... | A61L 9/03 392/391 |
| 2004/0045495 A1* | 3/2004 | Yamasaki | ........... | A01M 1/2055 116/207 |
| 2007/0181054 A1* | 8/2007 | Adair | .................. | A01M 1/2077 116/207 |
| 2009/0294553 A1* | 12/2009 | Wang | .................... | A01M 29/12 239/135 |
| 2009/0311148 A1* | 12/2009 | Adair | .................. | A01M 1/2077 422/173 |
| 2011/0057051 A1* | 3/2011 | Wang | .................. | A01M 1/2088 239/34 |
| 2011/0139894 A1 | 6/2011 | Masterson | | |
| 2013/0251773 A1* | 9/2013 | Galiatsatos | ............ | A01N 25/18 424/403 |
| 2014/0063782 A1* | 3/2014 | Shapiro | ................. | F21V 33/006 362/96 |

* cited by examiner

*Primary Examiner* — Regina M Yoo
(74) *Attorney, Agent, or Firm* — Levisohn Berger LLP

(57) ABSTRACT

Mats of different sizes formed of single mats having different sizes or a multilayer mat which are provided for area insect repellent devices which contain a heat plate to heat the mat structures carried thereabove, thereby providing different operating characteristics of the repellent device.

4 Claims, 4 Drawing Sheets

DEVICE FOR DISPENSING VOLATILE SUBSTANCES WITH VARIABLE MAT STRUCTURES

RELATED APPLICATIONS

This application is based on the priority of provisional patent applications Ser. No. 61/921,795, filed Dec. 30, 2013 and Ser. No. 61/948,296, filed Mar. 5, 2014, the contents of which are incorporated herein.

BACKGROUND OF THE INVENTION

This invention relates to variable mat structures with volatilizable chemicals used for area insect repellent devices.

Generally, such devices include a plate which is heated upon which is carried a mat with volatilizable chemicals thereby releasing the chemicals either naturally with heat or with a fan assist. The prior art devices include means to replace the mats when all the repellent chemical has been volatilized therefrom, and replacing mats is simply replacing one for another.

In view of the varying environments in which area repellent devices may be used, variable thickness mats and/or mat structures made of a plurality of individual layers may provide broader and more versatile effects which, heretofore, have not been available.

It is an object of this invention to provide variable mat structures more adaptable to different environments and different uses.

Another object of this invention is to provide a mat structure which is capable of volatilizing chemicals without requiring a heating plate.

Still another object of this invention is to provide a mat structure which is either of variable thickness or comprising multiple layers, all of which are held in a holder suitable to adjust to the size of the mats as they are utilized.

Yet another object of this invention is to adjust the temperature that reaches the multilayer structure to better be suited to the chemicals in the mats and/or to provide an alternate source of heating the mats.

Another object of this invention is to provide mats where the active ingredient is heated to a lower temperature, thereby allowing volatilization at the lower temperature, which may have advantageous uses.

Other objects, advantages and features of this invention will become more apparent from the following description.

Still further, the above objects may also be realized by providing either a single thicker mat and a holder for it, or a mat structure comprising a plurality of mats, all of which need to be accommodated in portable area repellent devices.

SUMMARY OF INVENTION

Providing singular mats or a plurality of layers for mat structures provides a range of adaptability not otherwise available. In one embodiment, a multilayer mat structure is provided for generally conventional prior art heating plates, but an insulation layer is provided so that the temperature to which the mat is heated is lower thereby taking advantage of active ingredients which can be volatilized at lower temperatures. A benefit to having the active ingredient on the mat be insulated is that low temperature active ingredients can be used on standard units. This enables prior art repellent devices to be used with different lower temperature ingredients in the pad by merely changing the mat placed on the heating plate 12 with a multilayer mat.

In yet another embodiment of this invention, the mat structure is constructed of multiple layers in which each layer may contain a different ingredient. When the layers are cool, the ingredients remain separate, but when heated the vapors mix to perform a desired function. Still further, one of the layers may contain ferrous metal particles, which when exposed to ambient air oxidize causing heating of that layer. The ferrous metal particles are a heat conducting material. With multiple layers so described, and exhibiting exothermic properties, it may not be necessary to have a heating plate heated by a combustible gas or an electric current.

Some of the various volatizable substances include natural oils which range from fast to slow to volatize. Other chemicals such as metofluthrin and transfluthrin have low vaporizing temperature; natural oils have a wide range in the middle with prallethrin next and finally allethrin has the highest temperature for vaporization of active ingredients.

In view of the adaptability of the above structure, it may be desirable to provide a multiple layer mat comprising several layers, of which one or more may contain exothermic reactions to provide sufficient heat to volatilize the substance contained in the mats. Such a structure which contains a chemical, which itself can generate heat when exposed to ambient air, further provides portability and the possibility of a user wearing such a device because of the elimination of a flame or other catalytic heating element to heat the prior art heating plate.

In yet another embodiment, a mat is constructed of multiple layers in which each layer contains an active ingredient compounded with additives so that vaporization will occur at different temperatures. For example, one layer may have the active ingredient formulated to vaporize at low temperature, hence releasing quickly; another layer may contain active ingredients formulated to vaporize at high temperature to provide longer running time.

In a further embodiment of the invention set forth herein a portable dispensing device is provided that may accommodate mats of a variety of thicknesses. The inventive devices are provided with a slot or similar receiving area for a mat that has a movable element. The movable element may be moved to alternately enlarge or diminish a receiving area for a mat—thus allowing for a single device that may be used to accommodate a range of mats.

In order to provide mats for dispensing substances—volatile substances may be placed upon and/or absorbed into absorbent mats. This combination of a volatile substance and mat is a convenient way to provide a fixed dose of the volatile substance to be released over a period of time. The quantity of the dose and the release time are influenced by the thickness and surface area of the mat. Some of the factors that influence the release rate of the volatile substance are:

1. Air flow over the surface of the mat;
2. Temperature of the mat;
3. Absorbency of the mat material;
4. Presence of chemicals to enhance or retard release rate;
5. Thermal conductivity of the mat material; and
6. Thickness of the mat.

One aspect of this invention is a device that can accommodate mats of different thicknesses while holding other variables constant. It has the advantage of dispensing more or less volume of volatile substance according to the mats' thickness. Also, a thin mat will allow the volatile substance to vaporize more quickly than a thick mat of the same material holding the same amount of substance.

For a device like the ThermaCELL® Mosquito Repellent, the grill forms one boundary against which the mat rests, and the heating plate forms the other. That is, any mat to be used with such device must fit within the fixed slot defined by the heating plate which acts as a floor and the grill which acts as a ceiling. However, in an embodiment of the invention set forth herein, an entire burner enclosure/heating plate is spring loaded so the heating plate can move towards or away from the grill. In another embodiment, the grill is spring loaded to move towards or away from the heating plate. In the first embodiment, a user would either raise/lower the heating plate to respectively diminish/enlarge the slot, whereas, in the second embodiment, a user would raise/lower the grill to respectively enlarge/diminish the slot size. Hence, in either embodiment, a variety of mat thicknesses can be accommodated. The mat insertion area may be configured so that the mat itself, when inserted, can spread the heater/grill parts to accommodate the mat.

In still another embodiment of this invention, rather than using a single mat of varying thickness, a multilayer mat structure may be provided. In such an embodiment, each layer of the mat may comprise different chemicals, or one or more layers may comprise a ferrous metal particles or other material which heats when exposed to ambient air, all of which may eliminate the need for a heating plate on top of a flame or other catalytic heating apparatus. The location of the mat layers which provide heat to volatilize chemicals and other layers may be selected to be most advantageous for the various chemicals to be volatilized.

DETAILED DESCRIPTION OF THE INVENTION

Embodiments of the present invention will now be described with reference to the above-identified drawings. However, the drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

Figure 1:
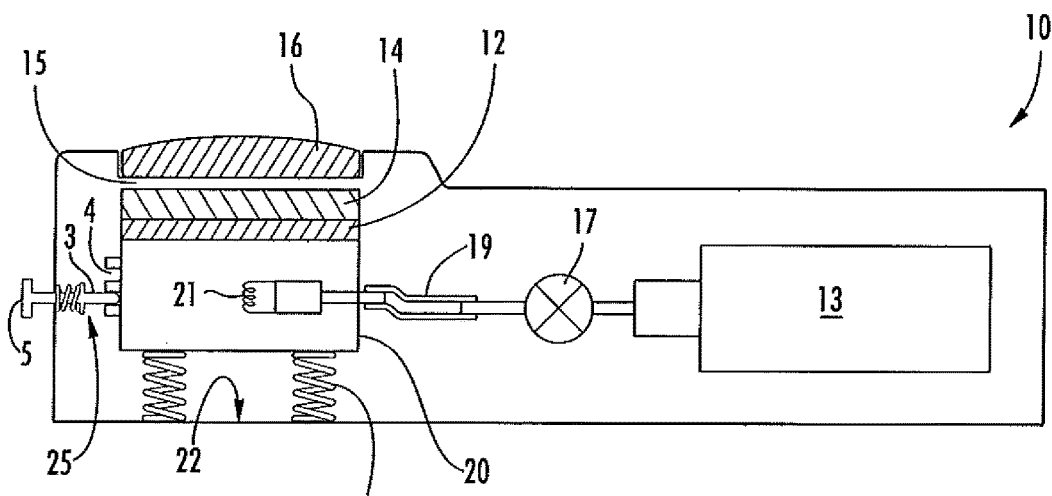
FIG. 1 is a schematic side cross-sectional view of a first embodiment of the invention with a heating plate structure.

FIG. 1 shows a dispensing device 10 is provided with a heating plate 12—which is a substantially flat thermally conductive surface upon which a mat 14 is placed. A grill 16 is disposed above and substantially parallel to the heating plate 12. A cartridge 13 has butane which passes through gas valve 17 and flexible tubes 19 to power burner 21. Mat 14 used with the device fits within the space or compartment 15 between the heating plate 12 and the grill 16. In the embodiment shown, rather than being fixed—the heating plate 12 is capable of upward and downward movement to adjust the distance in the compartment 15 between the heating plate 12 and the grill 16.

In one embodiment of the invention and as shown in FIG. 1, one or more springs 18 are mounted between the underside (bottom surface) of the heat box 20 and the floor 22 of the device 10. Springs 18 bias the heat box 20 and the attached heating plate 12 to move upwardly. The spring bias may be overcome to move the heating plate 12 downwardly. In a preferred embodiment, a locking mechanism is provided to lock the heat box (and attached heating plate 12) at a desired distance from the grill 16. In one embodiment, the locking mechanism 25 comprises spring held finger 3 which slides into selected slots 4 physically attached to one side of heat box 20. Finger 3 is located in slots 4 by manually pulling head 5 which pulls finger 3 out of one slot 4 and pushes finger 3 in another of slots 4 according to the vertical location required to create space 15 for the different size mats 14. Thus, the heat box 20 can be locked in a series of positions along a continuum to allow for a plurality of different distances between the heating plate 12 and the grill 16.

Figure 2:
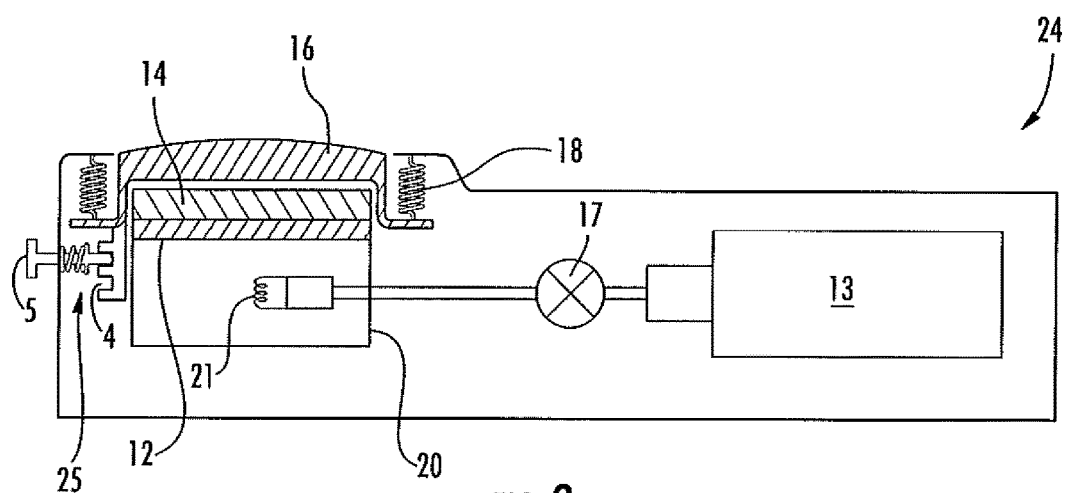
FIG. 2 is a schematic side cross-sectional view of another embodiment of a dispensing device having an adjustable slot for receiving a mat.

As shown in FIG. 2, device 24 is similar in construction to the device shown in FIG. 1—but rather than the heating plate 12 moving with respect to the grill—the grill 16 moves upward and downward with respect to the heating plate 12. This is achieved by way of one or more springs attached beneath the grill and which bias it upwardly—in a similar manner as springs 18 in FIG. 1. The same finger 3, slot 4 and spring controlled heat 5 are utilized to adjust the vertical position of grill 16 with locking mechanism 25 allowing different size mats 14 to be accommodated.

Figure 3B:
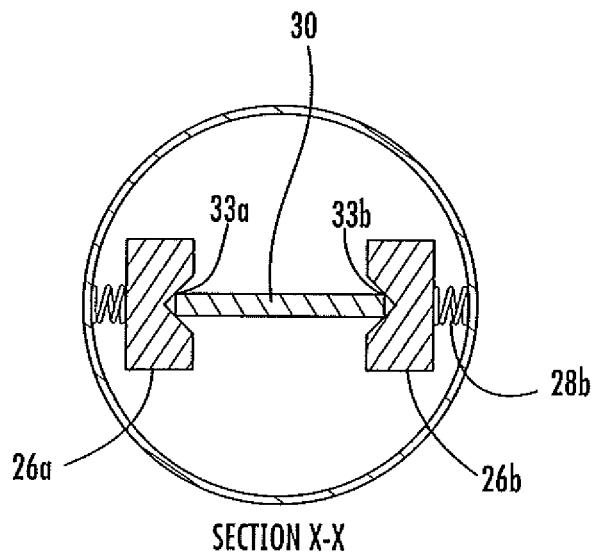
FIGS. 3a and 3b are a front sectional view and top cross-sectional view along X-X respectively of another embodiment of a dispensing device for accommodating mats of varying thicknesses.
Figure 3A:
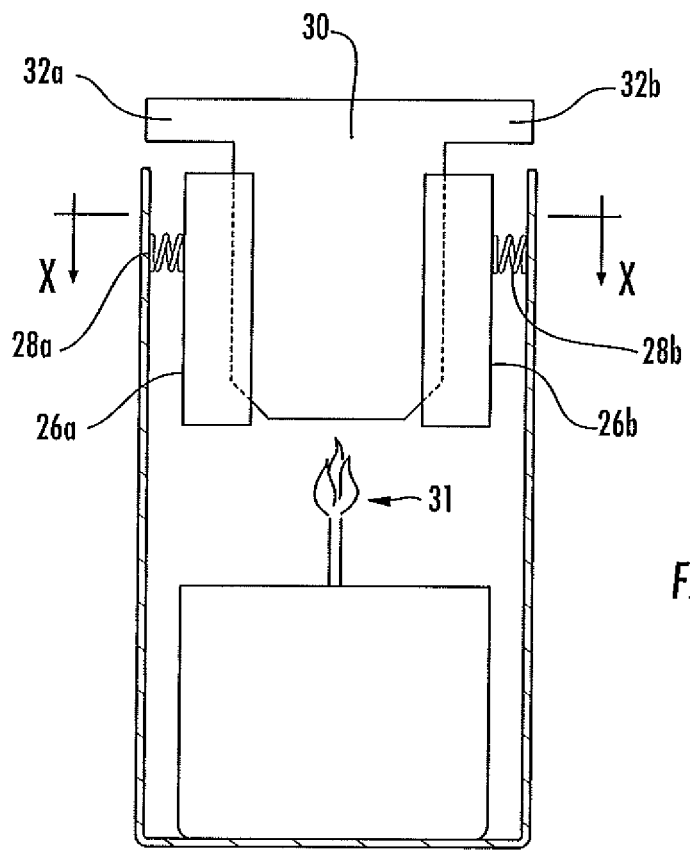

As shown in FIG. 3, rather than a horizontal mat resting on a heating plate as described above, a vertically oriented mat 30 is secured and gripped between two opposing movable jaws 26a, 26b. Diametrically opposed jaws 26a, 26b face one another, and each is biased toward one another by way of a backing springs 28a and 28b. The jaws 26a and 26b push against two opposing outer edges of mat 30 to secure the same above a heat source 31. In one embodiment, mat 30 is provided with an extending lip 32. Lips 32a, 32b may rest on the respective tops of jaws 26a and 26b when they are touching, adding stability to the grip.

Jaws 26a and 26b are manually retracted to the most distant positions to allow for easy insertion of mats 30. After mat insertion, the moving jaws 26a and 26b are released to apply force against the mat 30.

If the mat 30 is to be located over a stream of air (heated or not), it is important to center the mat over the air stream. In one embodiment of the invention, opposing jaws 26a and 26b have respective V grooves 33a and 33b, respectively. The V groove keeps the mat centered in the air stream. The embodiment of FIGS. 3a and 3b can accommodate mats of different thicknesses so long as the mats fit within the V grooves 33a and 33b.

Figure 4:
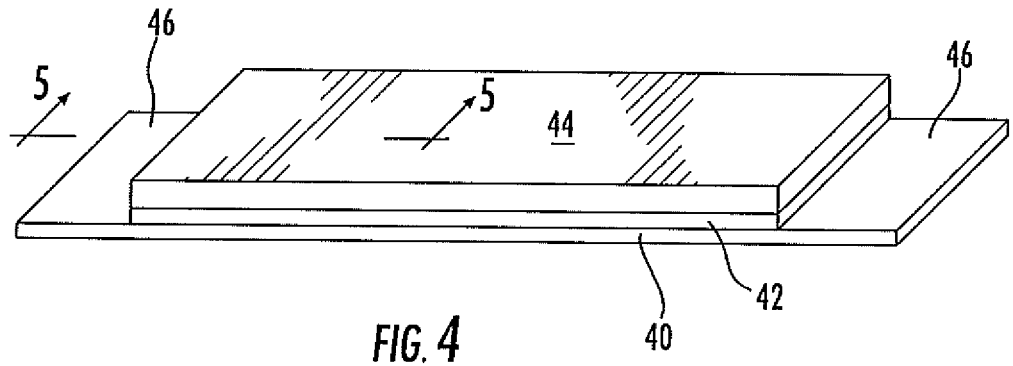
FIG. 4 is a perspective view of a multilayer mat structure having three layers according to an embodiment of the invention.

FIG. 4 is a sectional view of a multilayer mat embodiment of this invention.

The bottom layer 40 is a conductive layer. Conductive layer 40 is made of a thermally conductive sheet or similar surface. The layer 42 disposed atop of the conductive layer is an insulation layer, which is comprised of an insulating material. The top layer 44 is an absorbent layer. As seen in FIG. 4 mats 42 and 44 are coextensive. Absorbent layer 44 is impregnated with an active ingredient to be dispensed. As shown, in an embodiment of the invention, conductive layer 40 such as aluminum, extends in a lateral direction 46 farther than the length of the insulation layer 42 and/or the absorbent layer 44. As shown, layers 42 and 44 are of different thicknesses.

Figure 7:
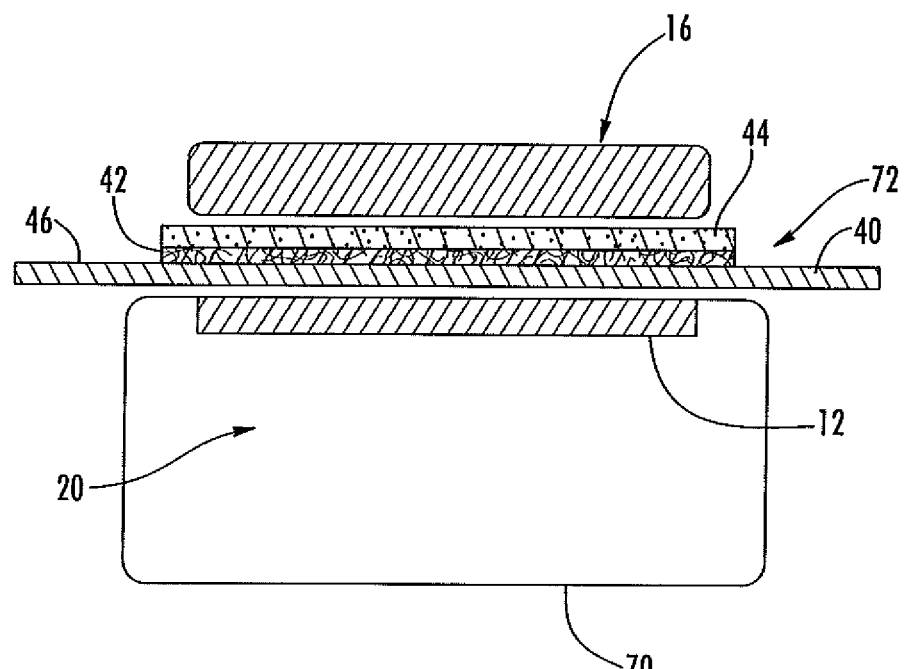
FIG. 7 is an illustrative cross-sectional view through a dispensing appliance with a multi-layer mat structure.

In use, a segment 46 of the conductive layer that extends past the end 45 of the insulation/absorbent layers is positioned in an area that is not directly above a heat source 12 (see FIG. 7). In one embodiment, the extending segment 46 of the conductive layer extends outside a dispensing appliance. The extending segment 46 of the conductive layer dissipates heat and effectively reduces the temperature that is reached by the absorbent layer 44, thus heating the layer to a lower temperature in this manner.

Figure 5:
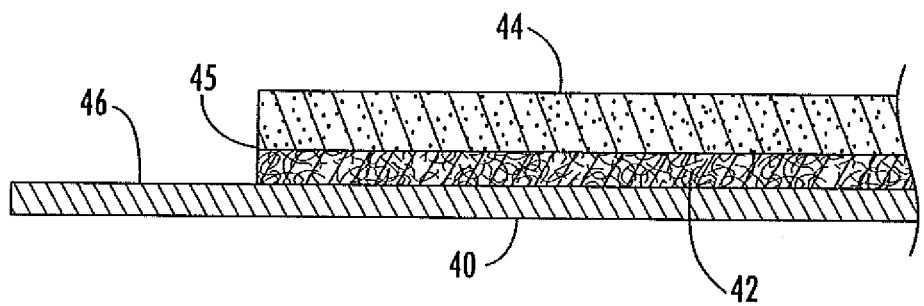
FIG. 5 is an enlarged side sectional view of a three-layer mat similar to that shown in FIG. 4.

As shown in FIG. 5, the extending segment 46 of the conductive layer 40 need not extend on two sides—and, as shown, the extending segment 46 may extend past only one side 45 of the insulation layer and/or absorbent layer.

Figure 6:
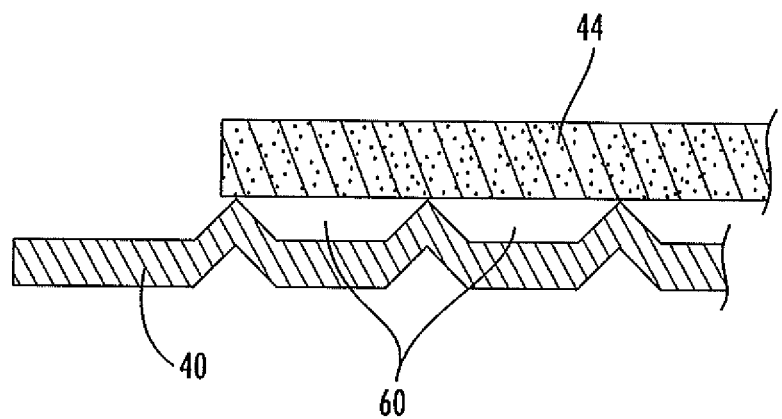
FIG. 6 is a side sectional view of another embodiment of a three layer mat.

FIG. 6 illustrates having several air gaps 60 between the conductive material 40 and the absorbent material 44 disposed thereabove. In one, embodiment, gaps 60 or elongated air channels are formed by folds or similar bends made to the conductive material 40.

As seen in FIG. 7, an appliance 70 is shown having a heating plate 12, which is heated by a heat source or heat box 20 disposed below the plate. A three-layered mat 72 as described above is placed on the heating plate and the extending segment extends outside of the appliance. A grill 16 is positioned on top of the mat.

In one embodiment of the invention, a dispensing device is configured to accommodate mats of different thicknesses. While FIGS. 4, 5 and 7 all show three layer mats, additional layers comprising a multilayer mat embodiment exhibiting different diameters may be employed. For example, a five layer structure could be employed with thin and thicker mats or containing different volatizable materials. Thin mats will hold less active ingredient and release it more quickly than thicker mats. Hence, a user may use any of various mats with different run times and release rates as needed. Additionally, the mats can be formed of different physical structures with denser mats slowing release of the volatizable materials while thin mats enhance the speed at which the volatizable substance is released.

With regard to the multilayer mat embodiment, the layers may comprise chemicals to provide different characteristics and control the temperature and sequencing of the released chemicals. One of the layers may be a quick release layer, while the other is a slow release layer, thereby extending the life of the repellent being volatized. In another embodiment, the chemicals could provide a synergistic reaction between the volatized chemicals to enhance the repellent function.

It will be understood by those of ordinary skill in the art that although the description set forth herein describe moving various parts of a dispensing device to accommodate different sized mats by way of one or more springs—the use of springs is exemplary only. It will be understood that any of various linear movement mechanisms may be utilized to move slot components to enlarge/diminish a slot size. Such movement mechanisms include, but are not limited to, rack and pinion members, sliding members, wheels, gears and pulleys.

Having described this invention with regard to specific embodiments, it is to be understood that the description is not meant as a limitation since further modifications and variations may be apparent or may suggest themselves to those skilled in the art. It is intended that the present application cover all such modifications and variations.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The Invention claimed is:

1. A portable area insect repellent device having a housing for variable thickness mats, said insect repellent device comprising:
a source of heat and a heating plate, a mat located above said heating plate
and a grill located above said mat,
said mat carrying volatilizable material to be heated and dispensed to create an insect repellent area,
said housing comprising a floor and a heat box having an underside:
an adjustable compartment comprising said heating plate and said grill comprising the top of said adjustable compartment; and
the underside of said heat box being vertically adjustable to adjust the size of said adjustable compartment, said adjustable compartment accommodating mats of different sizes, the size of said adjustable compartment being manually controlled by a user,
springs connected between said underside of said heat box and the floor of said housing of said device,
said springs vertically adjusting the space in said adjustable compartment,
said springs being biased pushing upwardly on said heat box.

2. The portable area insect repellent device as set forth in claim 1, wherein said mat comprises at least two layers with each layer of said mat comprising a volatilizable material, said volatilizable material in each layer of said at least two layers being volatilized at different run times.

3. The portable area insect repellent device as set forth in claim 1, wherein said mat comprises at least two layers, with at least one of said at least two layers containing a material that acts synergistically with the material in the other of said at least two layers.

4. The portable area insect repellent device as set forth in claim 1, further comprising a locking mechanism to vertically lock the location of said heating plate.

* * * * *